Patented Nov. 12, 1929

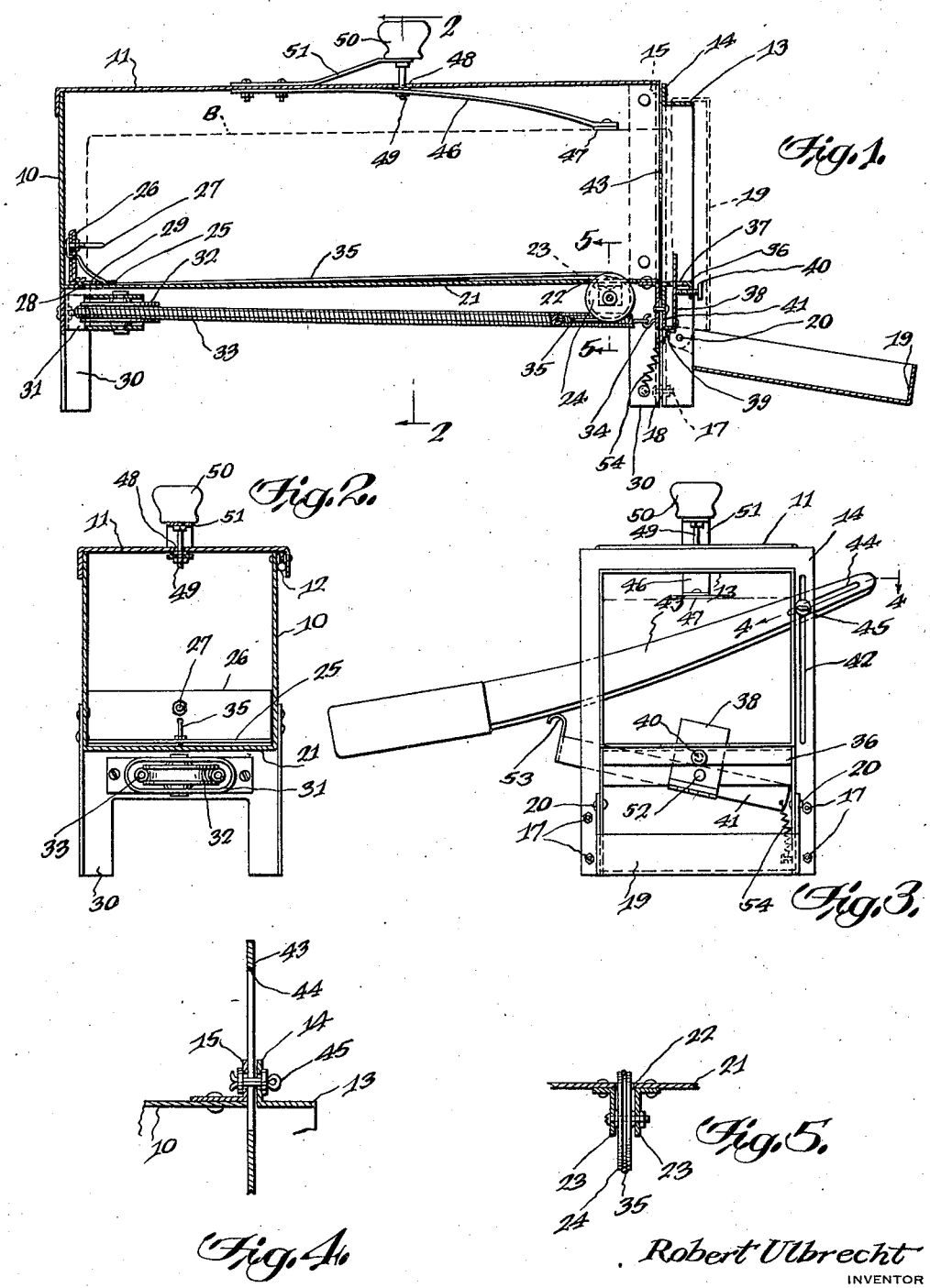

1,735,818

UNITED STATES PATENT OFFICE

ROBERT ULBRECHT, OF CHICAGO, ILLINOIS

SLICING MACHINE

Application filed February 20, 1928. Serial No. 255,748.

This invention relates to certain novel improvements in slicing machines and consists of a construction that may be readily associated with a suitable container in which the article to be sliced may be stored.

The salient object of my invention is to provide a container, adapted to receive a loaf of bread or the like, which will be arranged so as to embody a device for slicing the bread or the like.

An object, ancillary to the foregoing, is to arrange the container in such a manner that it may be closed so as to protect the bread or other material stored therein.

Another object of the invention is to so arrange the container that the bread may be fed forward to the slicing means in an automatic and continuous manner.

A still further object of the invention is to so arrange the device that the thickness of the portions sliced from the loaf may be varied.

A still further object of the invention is to so construct a device of the foregoing character that it will be economical in construction and simple and efficient in operation.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a longitudinal sectional view depicting a preferred form of construction for my invention;

Fig. 2 is a transverse sectional view taken substantially on the line 2—2 of Fig. 1;

Fig. 3 is a view looking in at the right hand end of Fig. 1;

Fig. 4 is a sectional detail view taken substantially on the line 4—4 of Fig. 3; and Fig. 5 is a sectional detail view taken substantially on the line 5—5 on Fig. 1.

In the drawings wherein I have illustrated a preferred embodiment of my invention, 10 indicates a container having an open upper side closed by the hinged lid 11, said lid being connected to said body 10 by any suitable hinge structure such as that indicated by 12 in the drawings.

At one end of the body 10 an outstanding lip portion 13 is provided which includes a foot portion 14 disposed parallel to a flange 15 provided on the body portion 10. The bolt and nut constructions 17 are provided which hold the foot portion 14 in association with the flange 15 and spacing washers 18 are disposed between said portions 14 and 15 having a purpose to be brought forth hereinafter.

A door 19 is provided which is pivotally attached to the lip 13 in any approved manner such as the pintles indicated at 20 in the drawing. The door 19 is disposed around the lip 13 in order to close this forward end of the housing 10 as is indicated in dotted lines on Fig. 1. When the door 19 is moved from closed position it is disposed in the full line position shown in Fig. 1 and serves as a receiving member for the portions sliced from the material mounted in the housing 10.

In the bottom wall 21 of the housing 10 adjacent the front end of the device an opening 22 is provided. Depending ears 23 are secured to the under side of the wall 21 and rotatably support a groove pulley 24 as is clearly illustrated in Fig. 5. A slide 25 is provided which includes upstanding portions 26 on which the piercing portion 27 is mounted, said piercing portion being disposed parallel to the wall 21. In the wall 21 adjacent the rear end of the housing 10, a headed screw 28 is mounted. An opening 29 is provided in the slide 25 which is of a size sufficient to permit passage of the head of the screw 28. In a manner to be brought forth hereinafter, the slide 25 is held in a forwardly position so as to dispose the edge portion around the opening 29 under the head of screw 28 to prevent movement of the slide 25 until the same is detached from the screw 28.

As is clearly illustrated in Fig. 1, a suitable leg structure 30 is adapted to support the housing 10 in such a manner as to space the wall 21 from the member on which the container is mounted. A bracket 31 is mounted on the rearwardly disposed leg constructions 30 below the wall 21 and a pulley 32 is rotatably mounted in this bracket. A coil spring 33 is directed around the pulley 32 and one end thereof is detachably connected to the forwardly disposed leg construction 30 as indicated at 34. The opposite end of the spring 33 is connected to a cable 35 that is suitably directed around the pulley 24 and which extends along the upper side of the wall 21 and which is suitably connected to the slide 25. This construction causes the hereintofore mentioned forwardly urged movement of the slide 25 which is limited by engagement of said slide with the screw 28.

At the forward end of the device a suitable bracket 36 is provided which has an opening 37 formed therein. A tongue 38 projects through the opening 37 and is hingedly connected to the supporting portion 39 that is carried by the arm 41 which is pivotally connected to the forward leg construction 30. The set screw 40 is mounted in the bracket 36 and is adapted to bear against the tongue 38 and by varying the position of said set screw 40 the position of the tongue 38 may be varied.

In operation, a loaf of bread or the like indicated by B in the drawings, is so mounted in the container 10 that the piercing element 27 will enter the rear end thereof. By releasing the slide 25 from the screw 28 the spring 33 tends to urge the slide 25 forwardly and thus force the loaf of bread B forwardly into engagement with the tongue 38 which limits forward movement thereof.

In the flange 15 and the foot portion 14 which are vertically disposed on one side of the device, aligned openings 42 are provided. It has been pointed out that the flange 15 and the foot portions 14 are spaced apart and between these elements a suitable cutting element such as the knife 43 extends. A slot 44 is provided in the forward end of the knife and a pin construction 45 extends through the slots 42 and the slot 44 so as to permit the knife 43 to be moved in both a horizontal and a vertical plane. It is apparent that the loaf of bread B will extend beyond the position of the knife 43 the magnitude of this extent being determined by the position of the tongue 38. Therefore, by drawing the knife 43 downwardly and at the same time reciprocating it in a horizontal plane, a slice or portion may be cut from the loaf of bread B which after being cut will fall down into the door 19 which will be disposed in the full line position in Fig. 1. In order to prevent forward movement of the loaf of bread B until the knife 43 is retracted to its uppermost position I mount the spring leaf 46 on the under side of the lid 11 which includes a foot portion 47 that is adapted to bear against the loaf of bread B. An opening 48 is provided in the lid 11 and the stem 49 of the handle 50 extends therethrough, said stem 49 being suitably connected to the member 46. A suitable leaf spring 51 tends to hold the handle 50 in its uppermost position. By depressing the handle 50 the foot portion 47 is forced into engagement with the loaf of bread B and thus forward movement of the loaf B is prevented until said handle 50 is released.

The arm 41 is pivotally mounted as indicated at 52 and includes a formed portion 53 that is disposed in the path of the knife 43. A coil spring 54 is connected to the arm 41 as indicated best in Fig. 3 and tends to hold said arm in the position illustrated in said Fig. 3. However, when the knife 43 passes down through the loaf B so as to cut a portion therefrom, said knife engages said formed portion 53 and thus pivots the arm 41 downwardly which retracts the tongue 38 from stopping position which facilitates the falling of the portion cut from the loaf into the door 19. As the knife 43 is retracted a spring 54 acts to move the tongue 38 back into stopping position and when the knife 43 has attained its uppermost position the operator will release the handle 50 so as to permit the spring 33 to act through cable 35 and slide 25 to move the loaf of bread B forwardly into engagement with the tongue 38 which positions another portion of the loaf such that it may be properly cut from said loaf.

It is apparent from the foregoing that I have provided a device which will permit cutting so-called slices from a loaf of bread in a manner such that said slices may be of a variable uniform thickness. I have arranged the device in such a manner that it may expeditiously be closed so as to preserve the uncut portions of the loaf in a fresh condition which is obviously an advantage and inasmuch as the loaf is always urged forwardly, the portion will always be in cutting position.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claims.

Having thus described my invention what I claim as new and desire to protect by Letters Patent is:

1. In a device of the class described, a housing having an open end and an open upper side, a slide in said housing adapted to bear against an article introduced into said housing through said open upper side, a hinged lid for closing said upper side, a door for closing said open end adapted to be disposed when in open position to serve as a receiving member, spring means adapted to be connected to said slide whereby to urge said slide and the article carried thereby towards said open upper end, adjustable means for limiting said forward movement, cutting means including a knife adapted to be disposed in spaced relation to said adjustable limiting means whereby the portion of said article between said cutting means and said adjustable stop may be cut from said article, said stop including a portion adapted to be disposed below said knife whereby said stop may be retracted from limiting position, and means for holding said article against movement when said stop is retracted.

2. In a device of the character stated, a housing having an opened end, a guide member arranged at said open end including portions spaced from said open end to provide a slot, a slide in said housing, means for urging said slide toward said open end whereby to force an article toward said open end, a pivotally mounted member including a portion adapted to extend into the path of said article to limit the forward movement thereof, a knife adapted to act in said slot to sever a slice from said article, and means adapted to cooperate with said guide member for closing said open end and movable into a substantially horizontal position to receive a slice cut from said article by said knife.

3. In a device of the character stated, a housing having an opened end, a guide member arranged at said open end including portions spaced from said open end to provide a slot, a slide in said housing, means for urging said slide toward said open end whereby to force an article toward said open end, a pivotally mounted member including a portion adapted to extend into the path of said article to limit the forward movement thereof, a knife adapted to act in said slot to sever a slice from said article, and means adapted to cooperate with said guide member for closing said open end and movable into a substantially horizontal position to receive a slice cut from said article by said knife, said pivotally mounted member having a lug formed on one end portion thereof adapted to extend into the path of said knife whereby when said knife is moved through said article to cut said slice therefrom said knife will engage said portion and pivot said member to retract a portion thereof from the path of movement of said article, and means for normally holding said member with the portion thereof in the path of said article.

In testimony whereof I affix my signature.

ROBERT ULBRECHT.